June 4, 1940.  J. C. SMALTZ ET AL  2,203,638
VACUUM COOKING AND COOLING
Filed Jan. 21, 1939  3 Sheets-Sheet 3

INVENTORS
JOHN C. SMALTZ AND
CLAUDE J. COVERT,
BY
ATTORNEY

Patented June 4, 1940

2,203,638

UNITED STATES PATENT OFFICE 2,203,638

VACUUM COOKING AND COOLING

John C. Smaltz, New York, N. Y., and Claude J. Covert, Glen Rock, N. J., assignors to Vacuum Candy Machinery Company, New York, N. Y., a corporation of New Jersey Application January 21, 1939, Serial No. 252,082

6 Claims. (Cl. 53—21)

The present invention relates particularly, though not exclusively to the cooking of such materials as pie fillings, jellies, jams, preserves and the like. After cooking, these materials, particularly pie fillings, have to be cooled before they can be further used. The usual practice has been to put the cooled material aside on cooling tables or racks or in a refrigerator. This has involved loss of time and expenses of handling and storing. In the particular case of pie fillings, where starch, tapioca, agar agar, pectin or other thickening agents are employed, cooling according to such usual practice has caused separation of the thickening agent from the fruit juices and the collecting of the thickening agent in lumps. This results in lack of homogeneity of the batch and permits the juices of less consistency to soak into the crust of the pie, thus producing undesirable sogginess of the crust and "bleeding" of the pies.

Special objects of the invention are to overcome the faults and objections mentioned and to provide a process for such purpose, which will be entirely practical and desirable and suited to many other as well as to the foregoing useful purposes.

These objects are attained by the novel process hereinafter described, carried out by apparatus such as illustrated in the accompanying drawings and broadly covered in the claims.

The vacuum cooking and cooling unit which ordinarily may be employed consists in each of the forms disclosed, of a steam jacketed kettle 5, journalled on hollow trunnions 6, through which steam is admitted and discharged and a vacuum dome or hood 7, swivelled at 8, for cooperation with the kettle and having a vacuum off-take 9, carried through the swivel mounting.

Figure 2:
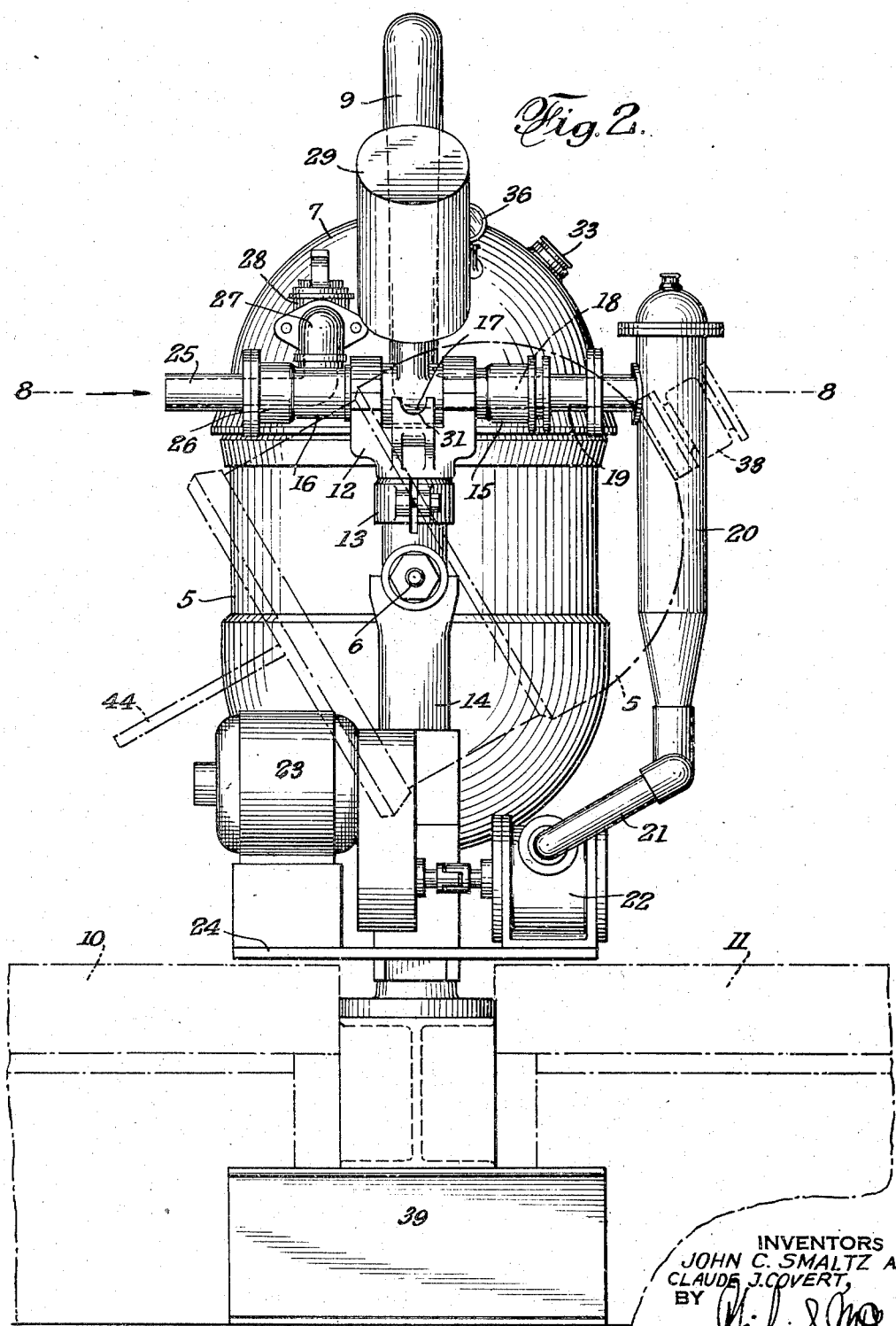
Fig. 2 is a side elevation of such apparatus.

In the first form disclosed, the kettle is intended to swing both ways, so as to discharge into or onto mixers or tables 10, 11, at opposite sides of the same, Fig. 2, and the swivelling axis 8, of the dome is therefore located to one side of the kettle above and substantially at a right angle to the trunnion axis.

In Fig. 2 the swivel support for the dome is shown as a yoke 12, adjustably held by a split clamp 13, in the upper split end of the trunnion post 14, and the vacuum line 9, is shown as having rectangularly related oppositely extending tubular portions 15, 16, at the end of the same journalled in the arms of said yoke.

As shown by broken lines in Fig. 2, the suction connection 9, is extended at 17, into the tubular branch 15, and at the end of the latter, a swivel fitting 18 provides connection with a stationary line 19, extending to a condenser 20. From the foot of the latter, the connection 21, extends to a suitable vacuum pump 22, and this, like the motor 23, which drives the same, is shown mounted on a special base bracket 24, projecting from the trunnion column 14.

A draw-in line for charging the kettle is indicated at 25, entered in a swivel fitting 26, in the end of the tubular journal member 16, and from this the line is extended at 27, into the side of the dome. A valve 28, in this short connecting line controls flow through the draw-in line into the kettle through the side of the dome.

To facilitate easy raising and lowering of the dome, the same is shown counterbalanced by a weight 29, on the end of a lever 30, connected with the swivel 15, 16, between the arms of the supporting yoke 12. This lever may rest in a bracket 31, outstanding from the yoke to support the counterweight and thus hold the dome in the desired raised relation.

The dome and kettle may be connected in the closed relation by suitable means such as swing clamps 32, and the dome may be equipped with such accessories as sight glass 33, thermometer 34, vacuum breaker 35, and vacuum gage 36.

If desired, the kettle may have a bottom discharge as indicated at 37, controlled by valve 38.

As shown in Fig. 2, where the kettle is to tilt both ways, the base structure 39 is preferably made narrow enough for the tables or other receiving members 10, 11, to be brought quite close together at the opposite sides of the kettle.

Figure 3:
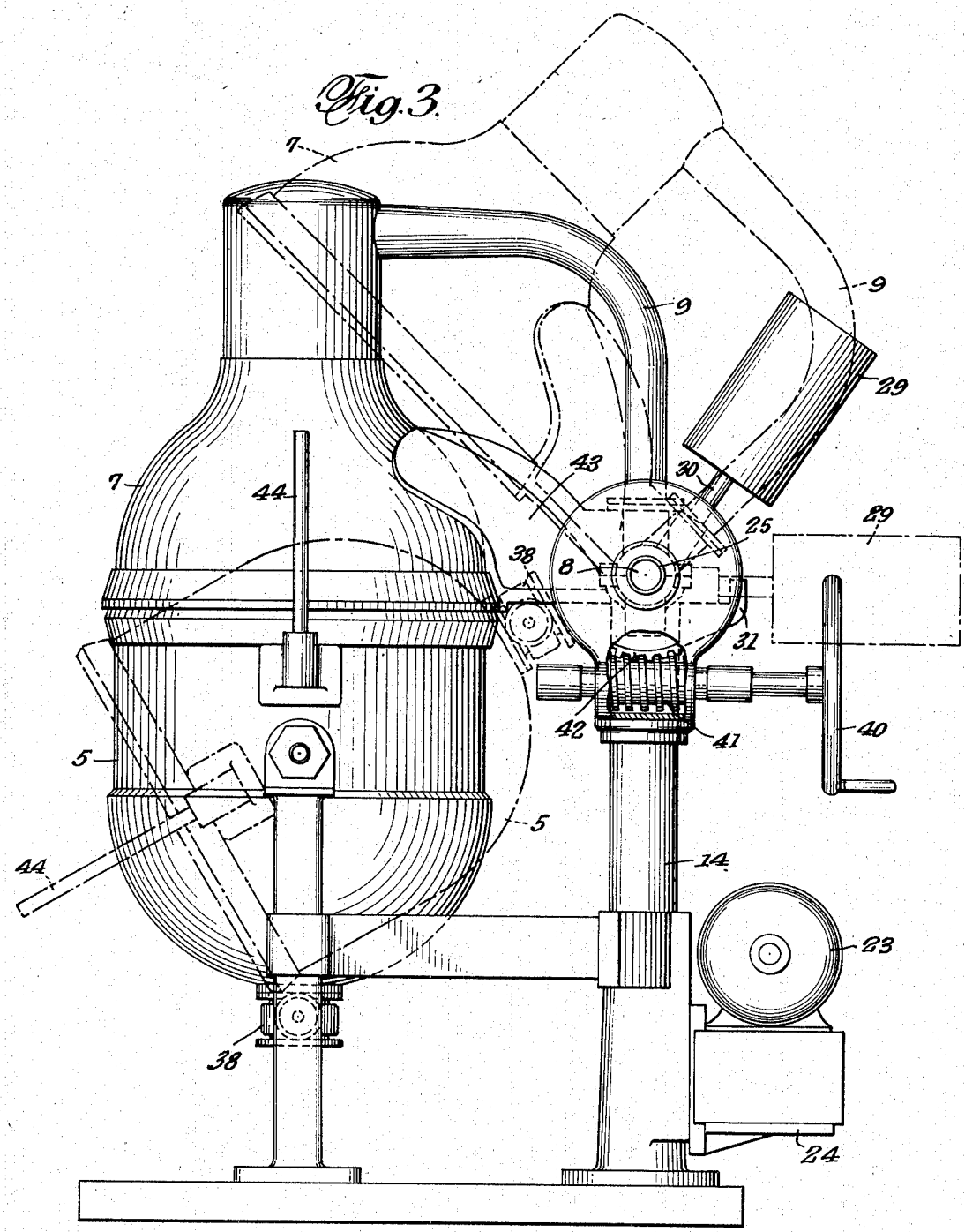
Fig. 3 is a side view of another form of apparatus suitable for carrying out the process with parts broken and appearing in section.

In the unit shown in Fig. 3, the kettle is only intended to tilt one way. In this instance therefore, the lower kettle is shown journalled on an axis substantially parallel with the axis 8, of the trunnions, so that it may swing forwardly away from the dome after the latter is lifted substantially as indicated in the broken lines. This view shows also how the raising and lowering of the dome may be effected and the dome held in different positions by a hand wheel 40, carrying a worm 41, in engagement with a worm gear 42, on the trunnion fitting 43, of the dome. The draw-in line into the side of the dome may pass through this swivel fitting.

While usually desirable to fill or charge the vacuum kettle by placing the ingredients into the lower kettle with the dome separated from lower kettle or if pre-cooked in a separate kettle through a draw-in line as illustrated, the kettle may be charged in other ways. One advantage of the draw-in line is that after cooking in a pre-cooking kettle, which may be of the stationary type, the batch may be transferred through such line for final cooking and cooling in one of the units here disclosed.

Whether the cooking is carried out entirely in one of these units or first partly cooked and then transferred to the unit for final cooking and cooling, the final results are substantially the same.

In either instance, before the cooking is completed, the supply of heat is shut off and vacuum applied. This results in lowering of the boiling point and continuing of the boiling until evaporation is almost complete. In this period of lowering pressure and boiling at reduced pressure, rapid ebullition and constant stirring of the materials is maintained. This holds the mass in a homogeneous state and in the case of pie fillings, incorporating thickening agents, keeps the thickening combined with the juices and prevents the thickening from separating and forming lumps.

After discontinuance of heat and subjecting to high vacuum for a few minutes, the thickening will be so completely combined that it will not thereafter separate and become lumpy, even under refrigeration. Usually a period of from five to ten minutes treatment under a vacuum on the order of 29 inches of mercury will be sufficient to complete the final cooking and effect a cooling of the mass down to a temperature of around 80° F. to 90° F., where it is then suitable for immediate use in pie crust and pastry.

Figure 1:
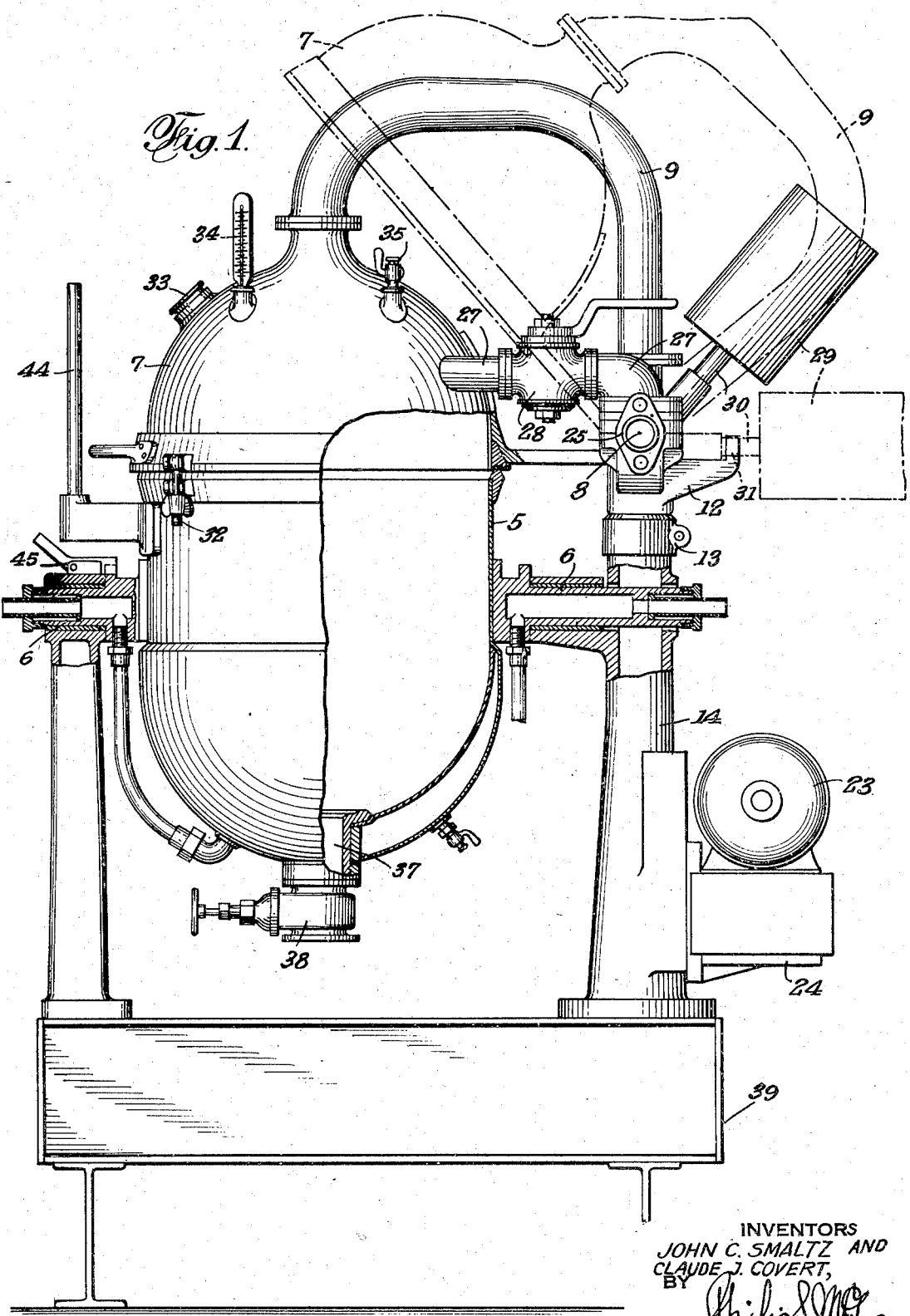
Fig. 1 is a front elevation of a vacuum cooking and cooling unit suitable for performing the process, with portions broken away and appearing in section.

While power means may be provided for tilting the kettle, it is usually sufficient to provide a handle for the purpose, such as the hand lever indicated at 44. Also means such as the locking lever 45, Fig. 1, may be provided for securing the kettle in the upright relation.

The new method of vacuum cooking and cooling here disclosed may be carried out in other forms of apparatus than those illustrated, for example, in gas heated vacuum cookers of the type in which the lower kettle is raised and lowered in respect to a vacuum dome. In such instances, a hand operated nut and screw or, by preference, a foot operated treadle and cam is employed for quickly raising and lowering the kettle in relation to the relatively stationary vacuum dome. The kettle and its heating furnace may be mounted on an auxiliary sliding platform so that the kettle and furnace may be slid out to fully expose the kettle for convenient hand stirring, etc. Steam may be employed in such a unit in place of gas heating and in such event, the steam would be introduced to the heating jacket about the kettle by suitable flexible hose connections.

The process may be carried out also in the old type vacuum vessel not having the separable, removable top dome or bottom kettle and which may or may not include a draw-in connection with valve and a draw-off valve or manhole through which the vessel may be charged or from which finished material may be dipped out of the machine. The arrangement first disclosed however, wherein the material is first treated in the lower kettle of a vacuum vessel equipped with a dome separable from the lower kettle or in a precooking kettle and then transferred by a draw-in connection through the axis forming trunnion of the kettle top or vacuum dome into the cooking and vacuuming apparatus, is particularly suited to the best accomplishment of the results desired. In handling pie fillings and similar materials, the batch is thus brought to approximately the boiling point and cooking continued in the usual manner until the material being cooked has reached the desired consistency and condition and cooling is quickly accomplished without affecting the homogeneity of the mass or causing any separation or lumpiness of the thickening agent.

What is claimed is:

1. The herein disclosed method of cooking and cooling materials in the nature of pie fillings and containing thickening mediums which ordinarily separate out and become lumpy on forced cooling, which comprises completing the cooking of a batch of such material under partial vacuum and after discontinuance of heat, continuously increasing the degree of partial vacuum to effect continued boiling and rapid ebullition with reduction in pressure and lowering of temperature.

2. The method of cooking and cooling pie fillings containing thickening agents in the nature of starch and tapioca and which ordinarily separate out and become lumpy on forced cooling, which comprises sealing off the batch at approximately the end of the required cooking time and after discontinuance of the cooking heat subjecting the batch to relatively high vacuum to thereby continue the boiling and ebullition under reduced pressure and lowering temperature.

3. The herein disclosed method of cooking and cooling materials containing thickening agents which ordinarily separate out and become lumpy on cooling, which comprises cooking a batch of the material and completing the cooking under partial vacuum after discontinuance of the cooking heat and then subjecting the batch to high vacuum to continue the boiling and ebullition of the mass under lowering pressure and temperature conditions inhibiting separation and lumping of the thickening agent.

4. The herein disclosed process of cooking and cooling materials containing thickening agents which ordinarily separate out and become lumpy on cooling, which comprises precooking a batch of the material in a kettle open to atmosphere and connected by a draw-in line with a vacuuming vessel and when cooking is nearly completed, applying the vacuum of said vessel to effect transfer of the precooked mass through the draw-in line under atmospheric pressure and then sealing off said material in the vacuum vessel and applying high vacuum to continue boiling and ebullition of the material under lowering pressure and temperature inhibiting separation and lump formation of the thickening ingredient.

5. The herein disclosed process of cooking and cooling materials such as fruits, berries, jellies, jams, syrups and the like, which lose color, flavor and natural appearance when cooked and cooled by ordinary methods, which comprises pre-cooking a batch of material in a vessel open to atmosphere and then sealing off said material and applying high vacuum to continue boiling and ebullition of the mass under lower pressure and temperature.

6. The herein disclosed process of cooking and cooling materials containing thickening agents which ordinarily separate out and become lumpy on cooling, which comprises pre-cooking a batch of material in a vacuum vessel open to atmosphere and then sealing off said material and applying high vacuum to continue boiling and ebullition of the mass under lowering pressure and temperature inhibiting separation and the congealing in lumps of the thickening agent.

JOHN C. SMALTZ.
CLAUDE J. COVERT.